J. V. NORTON.
Whiffletree.

No. 99,936. Patented Feb. 15, 1870.

United States Patent Office.

J. V. NORTON, OF PLAINVILLE, NEW YORK.

Letters Patent No. 99,936, dated February 15, 1870.

IMPROVEMENT IN WHIFFLETREES.

The Schedule referred to in these Letters Patent and making part of the same.

*To all whom it may concern:*

Be it known that I, J. V. NORTON, of Plainville, county of Onondaga, and State of New York, have invented a new and useful Improvement in Whiffletrees and Traces; and I do hereby declare that the following is a full, clear, and exact description thereof, which will enable others skilled in the art to make and use the same, reference being had to the accompanying drawing forming part of this specification.

Similar letters of reference indicate corresponding parts.

The object of this invention is to provide a convenient construction of harness wherewith to connect the ropes of hoisting apparatus, such as derricks, horse hay-forks, &c., with the draught animals.

The ordinary traces and whiffletrees heretofore in use are inconvenient, as they would drag on the ground whenever the rope was slackened. The whiffletrees especially were thereby rapidly worn.

My invention consists in continuing the whiffletree forward on the sides of the draught animal, and in suspending it by hip straps from the body of the same, and providing it with a hook for the attachment of the draft rope. The dragging of any part on the ground is thereby avoided, and more satisfactory action obtained.

Figure 1:
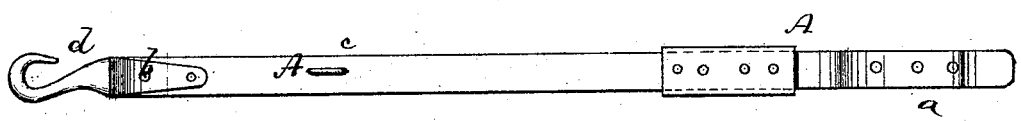
Figure 1 represents a side view of my invention.
Figure 2:
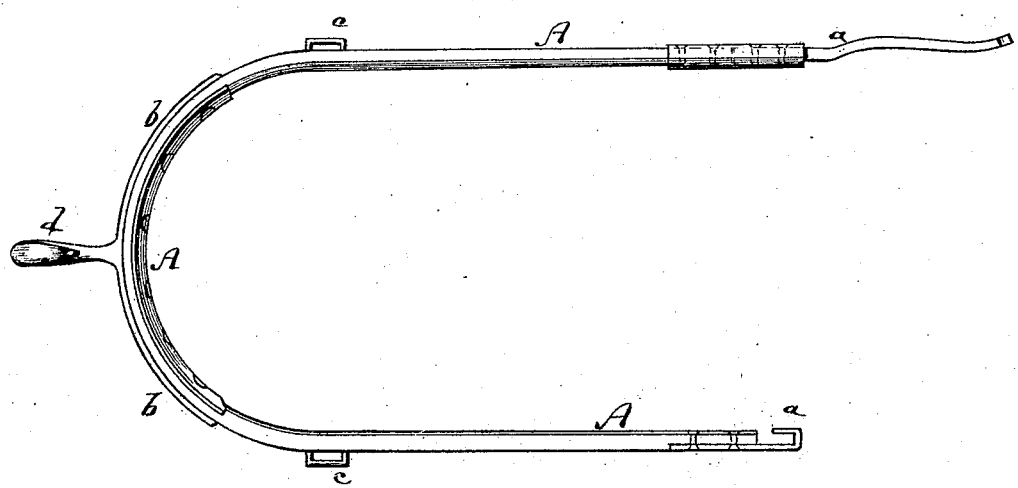
Figure 2 is a plan or top view of the same.

A in the drawing represents the improved whiffletree. It is made of wood, and is bent so as to be of semicircular form, with the ends extending in a straight direction and parallel to each other, as is clearly shown in fig. 2. The forward portions form part of the traces, or are at least in place of the same.

The front ends of the whifflletree have hooks $a$ or equivalent devices to be attached to the traces.

Metal straps $b\ b$ may be used to strengthen the wood.

A strap resting on the back of the animal is, with its ends, secured to the bar A at $c$, to support the same.

$d$ is a strong hook secured in the middle of the curved portion of the whiffletree. It serves to secure the draft-rope.

The whiffletree being thus continued forward and properly suspended will, whether the animal is drawing or backing up, always remain in the proper position, and will not chafe the animal nor become too rapidly worn.

Having thus described my invention,

I claim as new, and desire to secure by Letters Patent—

The curved whiffletree extended forward to constitute part of the traces, and suspended as set forth.

J. V. NORTON.

Witnesses:
S. P. DURKEE,
LYMAN NORTON.